(12) United States Patent
Yu et al.

(10) Patent No.: US 6,621,934 B1
(45) Date of Patent: Sep. 16, 2003

(54) MEMORY EFFICIENT COMPRESSION APPARATUS IN AN IMAGE PROCESSING SYSTEM

(75) Inventors: Haoping Yu, Indianapolis, IN (US); Barth Alan Canfield, Indianapolis, IN (US); Billy Wesley Beyers, Jr., Greenfield, IN (US); Wai-man Lam, Mohegan Lake, NY (US)

(73) Assignee: Thomson Licensing S.A., Boulogne Cedex (FR)

(*) Notice: Subject to any disclaimer, the term of this patent is extended or adjusted under 35 U.S.C. 154(b) by 0 days.

(21) Appl. No.: 08/910,709

(22) Filed: Aug. 12, 1997

Related U.S. Application Data
(60) Provisional application No. 60/033,607, filed on Dec. 17, 1996.

(51) Int. Cl.$^7$ ................................................ G06K 9/36
(52) U.S. Cl. ...................................................... 382/252
(58) Field of Search ................................ 382/232, 238, 382/239, 251–253; 348/396, 411, 412; 375/240.03–240.23

(56) References Cited

U.S. PATENT DOCUMENTS

| | | | |
|---|---|---|---|
| 4,422,094 A | | 12/1983 | Lewis, Jr. et al. ............ 358/37 |
| 4,656,500 A | * | 4/1987 | Mori ........................ 348/396.1 |
| 5,539,865 A | | 7/1996 | Gentile ........................ 395/115 |
| 5,764,374 A | * | 6/1998 | Seroussi et al. ............. 382/238 |

OTHER PUBLICATIONS

"Video compression makes big gains", by Peng H. Ang, Peter A. Ruetz, and David Auld—LSI Logic Corp., IEEE Spectrum—Oct., 1991, pp. 16–19.
"Fundamentals of Digital Image Processing", by Anil K. Jain, pp. 476–498, Prentice–Hall International, Inc.
N.S.Jayant/P.Noll:"Digital Coding of Waveforms", Prentice–Hall, pp. 188, 189, 191, 192, 283, and 286.
K.Pratt/H.G.Musmann:"Image Transmission Techniques–Advances in Electronics and Electron Physics,Suppl. 12", 1979,Academic Press, pp. 92–97.
Shuichi Matsumoto et al.:"120/140 MBIT/S Portable HDTV Codec and its Transmission Performance in a Field Trial Via Intelsat Satellite",Signal Processing,Image Communication, vol. 4,No. 4/05, Aug. 1, 1992, pp. 359–377.
Shuichi Matsumoto et al.:"120/140 MBPS Intrafield DPCM System for Digital Transmission of HDTV Programs", Signal Processing of HDTV, L'Aquila,Feb. 29–Mar. 2, 1988, No. Workshop 2,Feb. 29, 1988, Chiariglione L., pp. 509–516.
Saito M. et al.:"120 MBPS HDTV Codec and its Performance in a Field Trial",Signal Processing of HDTV,2, TURIN,Aug. 30–Sep. 1, 1989,No. Workshop 3,Aug. 30, 1989, Chiariglione L., pp. 611–618.
L.S.Golding/P.M.Schultheiss:"Study of an Adaptive Quantizer", Proceeding of the IEEE,vol. 55, No. 3,Mar. 1967,pp. 293–297.
PCT Search Report.

\* cited by examiner

*Primary Examiner*—Jingge Wu
(74) *Attorney, Agent, or Firm*—Joseph S. Tripoli; Ronald H. Kurdyla; Guy H. Eriksen

(57) ABSTRACT

An image processor produces a DPCM prediction error to be quantized. If the prediction error value is positive, the value passes unchanged to a quantizer. If the prediction error value is negative, a bias value is added to the prediction error value to produce a positive number within the operating limits of the quantizer. Biased prediction error values are quantized. Because all values received by the quantizer are positive and within the current quantizer limits, the quantization table used by the quantizer need not include quantization values for negative prediction error values. This reduces the scope of prediction error values by a factor of two, doubling quantization resolution.

13 Claims, 5 Drawing Sheets

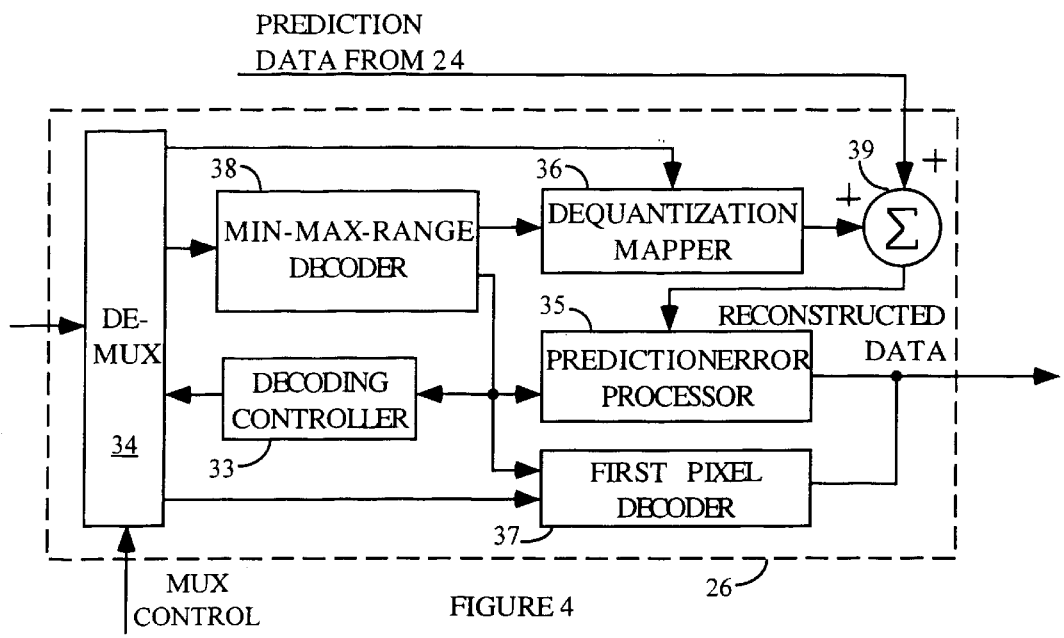
FIGURE 4
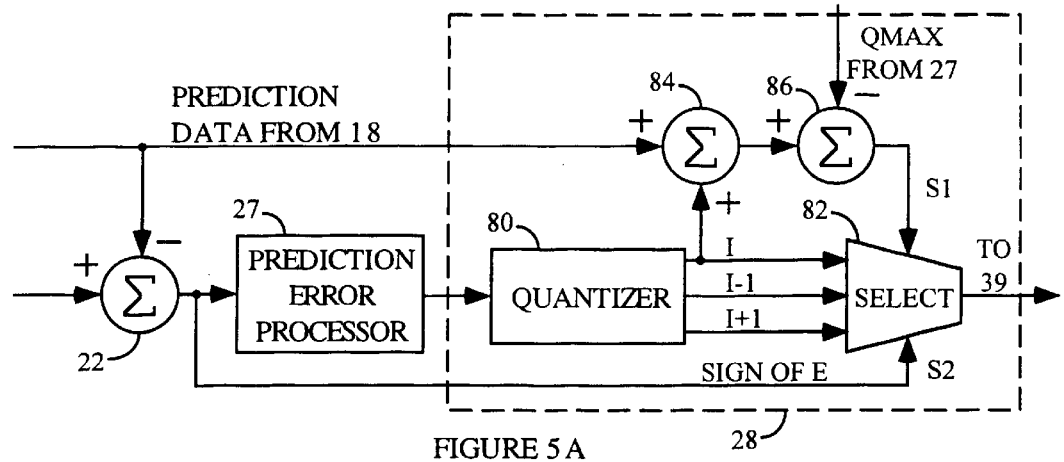
FIGURE 5A
FIGURE 5B
|      | +S1 | -S1 |
|------|-----|-----|
| +S2  | I-1 | I   |
| -S2  | I   | I+1 |

| INDEX | DECISION POINT | RECON. LEVEL | CODE WORD |
|---|---|---|---|
| 0 | 2 | 0 | 110 |
| 1 | 8 | 5 | 000 |
| 2 | 16 | 12 | 010 |
| 3 | 25 | 20 | 100 |
| 4 | 38 | 32 | 111 |
| 5 | 47 | 44 | 101 |
| 6 | 55 | 52 | 011 |
| 7 | 61 | 59 | 001 |

| INDEX | DECISION POINT | RECON. LEVEL | CODE WORD |
|---|---|---|---|
| 0 | 1 | 0 | 1110 |
| 1 | 4 | 3 | 000 |
| 2 | 7 | 6 | 0100 |
| 3 | 10 | 9 | 0110 |
| 4 | 13 | 11 | 1000 |
| 5 | 19 | 16 | 1010 |
| 6 | 27 | 23 | 1100 |
| 7 | 36 | 32 | 1111 |
| 8 | 44 | 41 | 1101 |
| 9 | 50 | 48 | 1011 |
| 10 | 53 | 53 | 1001 |
| 11 | 56 | 55 | 0111 |
| 12 | 59 | 58 | 0101 |
| 13 | 62 | 61 | 001 |

MEMORY EFFICIENT COMPRESSION APPARATUS IN AN IMAGE PROCESSING SYSTEM

This application claims priority of a provisional application, Ser. No. 60/033,607, filed Dec. 17, 1996 by Yu et al.

FIELD OF THE INVENTION

This invention concerns a digital video processor. Specifically, the invention concerns image compression method and apparatus for reducing the memory requirements of a digital video processor.

BACKGROUND OF THE INVENTION

The efficient use of memory is important in the design and operation of image processors. For example, consumer products such as television systems may use image processors including MPEG-2 signal processing. The MPEG (Motion Picture Experts Group) signal compression standard (ISO/IEC 13181-2, May 10, 1994) is a widely accepted image processing standard which is particularly attractive for use with satellite, cable and terrestrial broadcast systems employing high definition television (HDTV) processing among other forms of image processing. Products using high definition displays may require 96 Mbits or more of memory to temporarily store MPEG decoded frames prior to display. An MPEG processor requires these frames for motion estimation and compensation to reconstruct accurate images for display.

Systems which reconstruct images from MPEG decoded picture elements (pixels or pels) typically employ Differential Pulse Coded Modulation (DPCM). For DPCM, a processor generates a prediction value which anticipates the next pixel value. A summation network subtracts the prediction from the actual pixel value resulting in a difference which is used to represent the current pixel value as well as to anticipate the next pixel value. This difference, known as prediction error, is generally smaller than the original pixel or prediction values, so processing the difference rather than the original pixel value reduces system bandwidth requirements. The prediction error may have a positive or negative value. Ang et al., "Video Compression Makes Big Gains," IEEE Spectrum, October 1991, generally describes an MPEG encoder and decoder employing DPCM processing.

Memory efficient image processors use less memory to store image frames by recoding (recompressing) the block data prior to storage. In the spacial domain, reducing the number of bits per pixel used to store the image frames adversely affects the picture quality if the pixels can not be accurately reconstructed to their original bit size. Artifacts may occur, especially in smooth areas of the image. Memory reduction image processors should accurately quantize and dequantize the MPEG decoded signal as efficiently and economically as possible. It is known to take advantage of human optical physiology by processing luminance and chrominance data differently. Optimizing compression laws for each type of data to account for the energy in the data as well as what the human eye can see is described in U.S. Pat. No. 4,575,749, Acampora et al. The Acampora patent discloses amplitude compression to reduce noise in television signals prior to transmission.

The present inventors recognize the desirability of providing an efficient data reduction system employing minimal hardware and software which will save memory and reduce the physical size of the processor while minimizing artifacts introduced into the reconstructed data. A system according to the present invention satisfies these objectives.

SUMMARY OF THE INVENTION

In accordance with the principles of the present invention, an image processor produces DPCM prediction error values to be quantized. Prior to quantization, the processor determines if the prediction error is positive or negative. If the prediction error value is positive, the value passes unchanged to a quantizer. If the prediction error value is negative, a bias value is added to the prediction error value to produce a positive number within the scope of the quantizer. Biased and unbiased prediction error values pass to the quantizer. Because all values received by the quantizer are positive and within the current quantizer limits, the quantization table used by the quantizer need not include quantization values for negative prediction error values. This reduces the scope of prediction error values by a factor of two and doubles quantization resolution.

In an exemplary embodiment of the invention, a television receiver includes an MPEG decoder. A data compression network quantizes a decoded and decompressed MPEG signal representing 8×8 image blocks prior to storage in frame memory, and reconstructs the image blocks when needed for an image display. A display device displays image information derived from the frame memory.

To maintain data integrity through the data reduction network, the network scans a pixel block and determines the range of image pixel values. The network performs a best fit between the actual range and a set of predetermined ranges. Using the selected predetermined range, the network accesses a quantization table containing quantization levels derived from the positive domain of the predetermined range. The quantization table is of sufficient scope to quantize DPCM values as described above. For this example, the bias value described above is the selected predetermined range. Since the selected predetermined range is generally less than the largest possible pixel value for the system (256 for eight bits), and because the quantization table (and corresponding dequantization table) contain only positive values, doubling quantization resolution. It is possible to increase quantization resolution by a factor of 32 if the smallest predetermined range is adequate for a given pixel block.

A BRIEF DESCRIPTION OF THE DRAWINGS

FIG. 4 shows details of the decompression portion of the FIG. 1 system.

FIG. 5A shows details of the quantization mapper portion of FIG. 2.

FIG. 5B is a truth table for the Select block of FIG. 5A.

DETAILED DESCRIPTION OF THE PREFERRED EMBODIMENT

Figure 1:
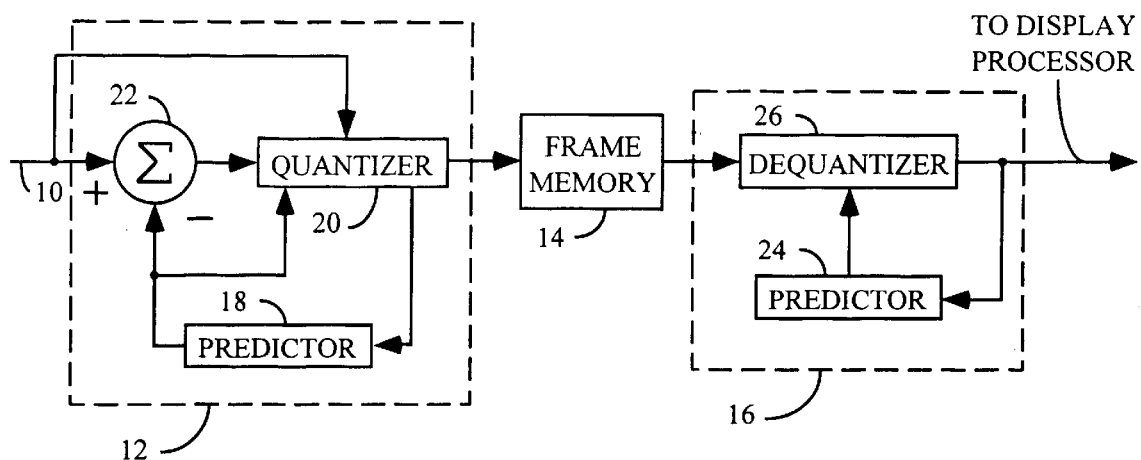
FIG. 1 is a block diagram of a pixel block processor including a system according to the present invention.

In FIG. 1, an MPEG decoder (not shown) provides a block of MPEG decoded pixel data to input 10 of a compressor 12. Compressor 12 includes a predictor 18, a quantizer 20, and a combiner 22. Predictor 18 employs well known principles and may be of the type described in Jain, A., Fundamentals of Digital Image Processing, Prentice-Hall, Inc., p. 484 (1989), for example.

Quantizer 20 provides a data reduced pixel block to memory 14. When a display processor (not shown) accesses the reduced data block in memory 14 to display an image, decompressor 16 reconstructs the original data block. Decompressor 16 includes predictor 24 and dequantizer 26 to retrieve reduced data from memory 14 and to reconstruct the reduced data block. Quantizer 20 and dequantizer 26 are arranged according to the principles of the present invention as will be discussed. Predictor 24 is similar to predictor 18.

Input 10 of compressor 12 receives a pixel block from an MPEG decoder, which will be discussed in association with FIG. 8. The pixel block is in the spatial domain, and comprises an 8×8 block of image pixels, for example. Input 10 supplies the pixel block data to a non-inverting input of combiner 22 and to quantizer 20. Predictor 18 supplies pixel prediction data to an inverting input of combiner 22 and to quantizer 20. Combiner 22 combines its signals from inverting and non-inverting inputs and provides the difference to quantizer 20. Quantizer 20 outputs quantized pixel values to predictor 18 and quantized pixel difference values to memory 14 for storage.

Figure 2:
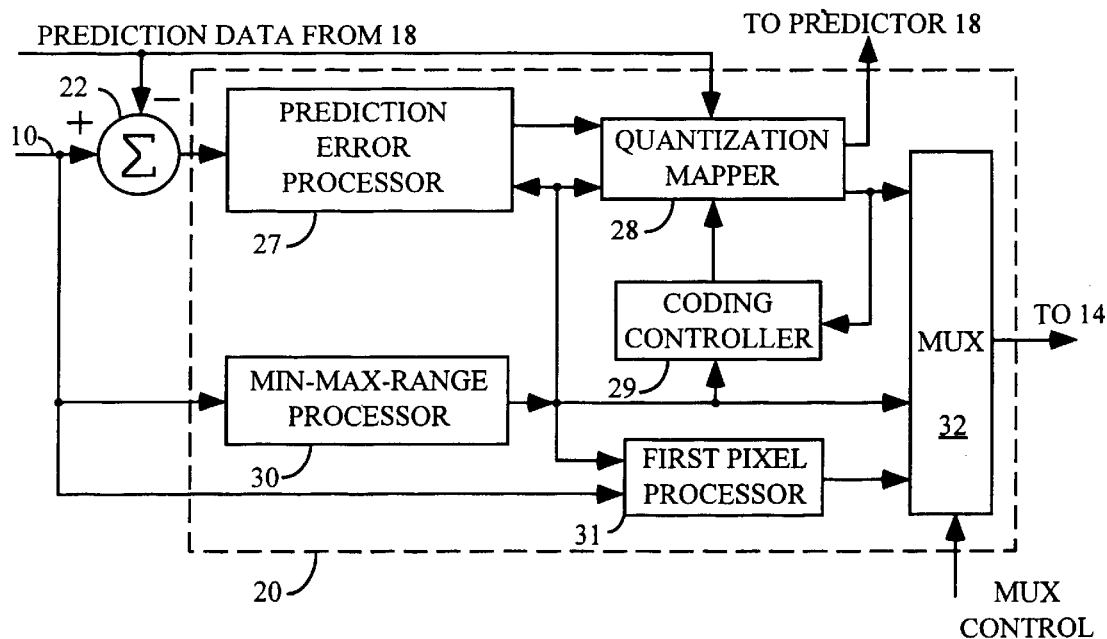
FIG. 2 shows details of the compression portion of the FIG. 1 system.

FIG. 2 illustrates quantizer 20 in greater detail. The same reference numbers identify common elements in FIGS. 1 and 2. Specifically, quantizer 20 includes prediction error processor 27, quantization mapper 28, coding controller 29, min-max-range processor (MMRP) 30, first pixel processor 31, and multiplexer 32. Input 10 provides block pixel data to MMRP 30, which scans the pixel block and determines the minimum pixel value, the maximum pixel value, and the range. MMRP 30 defines the actual range as the minimum value subtracted from the maximum value plus one (1). MMRP 30 selects a predetermined range from a set of predetermined ranges as a function of the actual range, and exchanges the selected predetermined range for the actual range for subsequent use within the network. MMRP 30 compresses the minimum, maximum and predetermined range block parameter values and transfers them to multiplexer 32.

The minimum pixel value and the range are also transferred to first pixel processor 31, and the range is transferred to prediction error processor 27, as will be discussed. Prediction error processor 27 receives prediction error data from combiner 22 and biases negative values with the selected predetermined range. Quantizer processor 28 receives biased and unbiased prediction error values from prediction error processor 27. These values are quantized and sent to multiplexer 32. Quantizer processor 28 also sends quantized prediction error values to predictor 18 which predictor 18 uses to calculate prediction data. Multiplexer 32 sends the block parameters and the quantized data to memory 14 under timing and control which will be discussed later. The block parameters represent overhead data which are stored in memory 14 within a parameter field associated with the quantized pixel block. The parameter field and the quantized data together form a packet which consolidates all of the information needed by dequantizer processor 36 to access appropriate dequantization tables and to reconstruct the pixel block. Coding controller 29 oversees the transfer of block parameters and compressed data, as well as the selection of quantization tables for individual pixel blocks, as will be discussed.

First pixel processor 31 receives the pixel block from input 10, and identifies a predetermined reference pixel value. The block minimum pixel value received from MMRP 30 facilitates compression of the reference pixel independently of other block pixels. The compressed reference pixel is represented with sufficient bits for dequantizer 26 to reconstruct its original value in a lossless or near lossless manner. First pixel processor 31 passes the compressed reference pixel value as a block parameter to multiplexer 32 which transfers block parameters, including the reference pixel value, and the quantized data to memory 14. Dequantizer 26 uses the reference pixel as a prediction value for the quantized block pixels during pixel decompression. Since the first value (the reference pixel value) used in the prediction network during decompression is independent, a given pixel block can be decompressed without information from other pixel blocks. This value is also accurate, which eliminates a propagating prediction error from the reconstructed data.

The reference pixel is compressed using the pixel block minimum value as a predictor for deriving the compressed value. The minimum value is subtracted from the reference value and the difference is divided by two. The result is stored in memory 14 with one less bit than is necessary for a binary representation of the range of the pixel values of the block. The range defines the number of bits used to store the compressed reference pixel value because, when using block pixel values as predictors for other values in the pixel block, the difference between any two block pixel values, such as the reference and minimum pixel values, will fall within the domain of the range. The domain of the range is from zero to the range value minus one (1). The compressed reference value uses one bit less than is necessary to represent the range because the difference is divided by two, which reduces the number of bits required for a binary representation by one bit.

Quantizer 20 and dequantizer 26 respectively access quantization and dequantization tables which are optimized to each block. The quantization and dequantization tables include values based on an approximate range of the pixel block. The range is the difference between the maximum and the minimum pixel values for a block. Min-max-range quantizer 30 receives an input data block and scans it to determine the minimum pixel value and the maximum pixel value. Quantizer 20 then subtracts the minimum from the maximum and adds one (max−min+1) to calculate the range for the pixel block.

Quantizer 20 compares the calculated range to a set of predetermined ranges, at least one of which is greater than or equal to the calculated range, selects a predetermined range, and accesses quantization tables derived from the selected predetermined range. The predetermined range is selected by a best fit analysis that identifies the predetermined range which is the smallest value of the set that is larger than or equal to the actual calculated range. The quantization and dequantization tables are customized to include values within the domain of the selected predetermined range, and therefore include values of the entire actual range. Quantizer 20 employs DPCM processing and produces difference values which are prediction errors. These prediction errors lie in the domain of the actual range if pixel values supplied to predictor 18 come from the same pixel block as the pixel for which predictor 18 is currently generating a prediction value. Compressor 12 follows and maintains this parameter. The actual range is often significantly less than 256 (the maximum value of an 8-bit pixel value), and table levels derived from this range produce better resolution than table levels derived from 256, because the selected predetermined range is generally close in value to the actual range. Therefore, system accuracy and efficiency increase by customizing the table levels to the range.

Figure 3:
FIG. 3 depicts a packetized data format suitable for use by a system according to the present invention.

To reconstruct the input block data, dequantizer 26 must know which predetermined range quantizer 20 used to access the quantization table employed when quantizing the pixel block. Representations of the range and other pixel block parameters are stored in memory 14 within a parameter field with the quantized pixel block. By storing a block parameter representation in memory 14 along with the quantized pixel block, decompressor 16 may access the proper dequantization table and reconstruct the pixel block efficiently and accurately. Other pixel block parameters included in the parameter field may be, for example, the minimum pixel block value or a reference pixel block value. FIG. 3 illustrates one possible configuration of a parameter field and compressed data. The parameter field consists of those block parameters contained within the dashed box in FIG. 3. In this embodiment, a parameter field is arranged as a header of a data packet containing a compressed data payload.

To maximize the reduction of frame memory without significantly degrading the displayed image, the overhead information represented by the block parameters in the parameter field is stored in memory 14. Every bit used to store the parameter field decreases the memory available for storing quantized pixels. Therefore, the number of bits required to store two of the block parameters, namely the range and minimum value, is reduced from eight bits to three bits for each parameter for most cases. This process works as follows.

The actual range is compared to a set of predetermined ranges to determine a best fit. The predetermined range becomes the value used to represent the range for the pixel block then being processed. The predetermined range is larger than the actual range to ensure that all pixel values within the pixel block are represented. The set of predetermined ranges include seven values, which are 16, 32, 64, 96, 128, 192, and 256. Since the set is available to both quantizer 20 and dequantizer 26, the predetermined range may be represented in the parameter field by one index value. The index requires only three bits for a binary representation because there are only seven predetermined ranges to represent.

The system handles the minimum pixel value in a similar manner. For five of the seven predetermined ranges, the system accesses a predetermined set of eight minimum pixel values unique to the selected predetermined range. Quantizer 20 compares the actual minimum pixel value to the predetermined set and selects the largest predetermined minimum value which is less than or equal to the actual minimum value. The predetermined minimum then becomes the value used to represent the minimum pixel for the pixel block being processed. The set is available to both quantizer 20 and dequantizer 26, so the predetermined minimum may be represented in the parameter field by one index symbol value. This index symbol also requires three bits for a binary representation because there are only eight predetermined minimum pixel values to represent.

The set of eight predetermined minimum pixel values for five of the seven ranges are defined by equation (1) below. The equation provides a constant linear step for each range minimum beginning with zero.

$$Q_{min}(R_s, i) = INT\{i((256-R_s)/7)\};\ 0<=i<=7. \quad (1)$$

In this equation i is the index symbol value represented by three bits in the overhead parameter field. INT{f(x)} indicates that only the integer portion of the resulting value is used. The five ranges to which equation (1) applies are 32, 64, 96, 128, and 192. The expression f(x) within the brackets represents any expression, such as the one in equation (1), upon which the function INT operates. For the predetermined range of 16, the original eight bit minimum value is used. For the predetermined range of 256, no minimum value is stored because the minimum value for 256 is zero (0) for an eight bit word.

Equation (2) below selects the predetermined minimum pixel value from the set which is substituted for the actual minimum pixel block value. $MAX_i\{f(x)\}$ indicates that the maximum value of i which satisfies the condition within the brackets is to be used to generate $Q_{min}$.

$$Q_{min} = MAX_i\{Q_{min}(R_s, i) | Q_{min}(R_s, i) <= X_{min};\ 0<=i<=7\} \quad (2)$$

Equation (2) may select a predetermined range which is not sufficient to cover the actual pixel block values when the quantized pixel block is reconstructed, because predetermined minimum values are less than the actual minimum value. For example, if in a given pixel block the minimum pixel value is 100 and the maximum pixel value is 140, then the selected predetermined range is 64. The selected predetermined minimum pixel value resulting from equation (1) is 82. The result of adding the selected minimum to the selected range is 146 which is greater than the actual maximum pixel value. Therefore, all of the values of the pixel block will be represented by the selected predetermined values. However, if the maximum pixel block value is instead 160, the selected predetermined values will remain the same but not completely represent the domain of the pixel block. In this case, the next higher predetermined range of 96 is selected and a new selected predetermined minimum value is 91. The summation of 91 and the predetermined range of 96 is 187, which is greater than the actual maximum pixel block value of 160. Therefore, the quantization and dequantization tables selected from this range will provide levels for all of the pixels in the block. Quantizer 28 performs the analysis described above to determine if the first selection of predetermined range and minimum pixel values is valid. If not, quantizer 28 selects the next larger predetermined range and selects a new minimum pixel value.

As stated earlier, if the prediction network derives its prediction values from pixel values within the same block, then the difference (E) between an actual pixel value and the predicted pixel value will be within the following limits:

$$-\text{Range} < E < \text{Range, where} \quad (3)$$

$$\text{Range} = X_{max} - X_{min} + 1 \quad (4)$$

In equation (3), E is the prediction error. In equation (4), $X_{max}$ and $X_{min}$ are the maximum and minimum block pixel values respectively. Therefore, the range of pixel data from the block defines the values which quantization and dequantization tables will receive, and the limits for which the tables must provide for that particular block. If the range is smaller than the maximum value of the word size (256 for an 8 bit word), then the resolution of the quantization and dequantization tables may be increased.

Figures 6A, 6B, 6C:
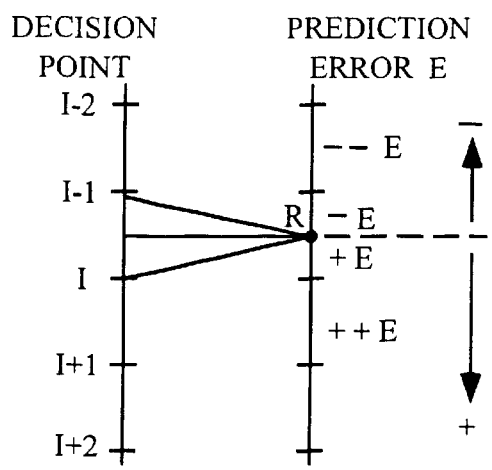
FIG. 6A illustrates the positive and negative properties of prediction error values about quantization table reconstruction levels.
FIG. 6B is a 4 bit quantization/dequantization table according to the present invention.
FIG. 6C is a 5 bit quantization/dequantization table according to the present invention.

Quantization and dequantization tables employing the principles of the present invention have twice the resolution of tables designed only to the range of the pixel block. The resolution is doubled because the tables need only to cover values from zero to the positive range value rather than all values between the negative and positive range. FIGS. 6B and 6C show three bit and four bit tables, respectively, for the predetermined range of 64. Prior to quantization, prediction error processor 27 (FIG. 2) determines if the prediction error from combiner 22 is positive or negative. If the value is positive it passes unchanged to quantization mapper 28. If the value is negative, prediction error processor 27 adds the range to the negative prediction error value before the value is passed to quantization mapper 28. Since a negative prediction error value is within the domain of the negative range value, adding the positive range value to the negative prediction error value results in a biased error value. This biased error value is positive (greater than zero) and is less than the positive range value. Quantization mapper 28 receives both biased and unbiased prediction error values and quantizes them with a quantization table adapted to the domain of the positive predetermined range. Quantized error values are passed to multiplexer 32 and then stored in memory 14 under the control of a system controller (not shown).

Since a quantization table employing the principles of the present invention only quantizes values from zero to the range-1 instead of from the negative range value to the positive range value, the resolution of the table is doubled. For example, if the predetermined range of pixel values for a given block is 64, and if there are 14 quantization/dequantization levels in a table, tables not using the principles of the invention will have an average resolution of 9.2 (rounded to the nearest tenth) between each level ((64×2)/14). The same tables designed according to the principles of the present invention have a doubled average resolution of 4.6 (also rounded) between the 14 levels (64/14) for the same predetermined range.

The table shown in FIG. 6B has fourteen possible quantization levels, compared to a maximum of sixteen possible levels in a typical four-bit table ($2^4$). The number of possible levels is reduced because two of the symbols (000 and 001) contain only three bits. The three-bit codeword symbols are placed within the fourteen level table such that they are accessed frequently creating significant reduction in bandwidth and memory requirements outweighing the loss in data resolution. In a quantization table having N levels (e.g., 14 levels), each level having an associated output symbol of predominantly M bits (e.g., 4 bits), at least one level (e.g., levels 1 and 13) is associated with frequently occurring input values and a corresponding unique codeword symbol having less than M bits (e.g., 3 bits).

A decompression network must identify the three-bit and four-bit symbols when the data is retrieved for decompression. This is facilitated by reserving the bit pattern of the three-bit symbol. For example, in FIG. 6B only the three-bit short symbols have the patterns "000" and "001." The three bits of all short symbols are reserved such that whenever either bit pattern occurs in predetermined bit positions, the network identifies the three-bit symbol and does not process a fourth bit when dequantizing and reconstructing the eight-bit data value. For all four-bit patterns any chosen three-bit pattern will occur twice. Only one of these occurrences will represent a quantization level in a table, because the network can only recognize one level for the three-bit symbol without other information. Any three-bit pattern may be used in the case of a four-bit table, and only the three-bit symbol may have the reserved pattern.

For a given system in which the tables are used, if a designer determines that it is more efficient to use one three-bit symbol instead of two in a predominantly four-bit table, then the quantization and dequantization tables may be designed with fifteen or fewer levels.

The one or more three-bit symbols are positioned so as to optimize the chances of the symbols being associated with frequently occurring input data values during quantization. Therefore, a particular system must be evaluated in advance so as to statistically identify where to place the short three-bit symbols. The resolution of the level(s) to be represented by three-bit symbols may be adjusted to optimize the use of the three-bit symbols. In FIG. 6B, the three-bit symbols are placed about zero where the prediction error is most likely to occur for this system once biasing is backed out of the table. That is, negative input prediction error values with a small absolute value will be biased and input into the quantization table as a large number relative to the domain of the table. Index level 1 is the level for input values on the positive side of zero prediction error. Index level 13 is the level for input values on the negative side of zero prediction error with bias added. Upon dequantization and reconstruction, bias value is removed from appropriate level 13 reconstruction values. Placing two short symbols ("000" and "001") on either side of level 0 maintains symmetry and reduces bandwidth and memory requirements compared to placing one short symbol at level zero. Level 1 and level 13 each have a resolution of three (from 4 to 1 for level 1), because the table level placement and level resolution are optimized for statistical occurrence. Again, depending upon the type of compression network involved, the placement of the three-bit symbols depends upon the statistical occurrence of data values the quantization and dequantization tables receive. The statistically optimal placement may vary between different types of systems without affecting the implementation of short codeword symbols.

FIG. 4 is a block diagram of dequantizer 26 of FIG. 1. Under control of a system microprocessor, demultiplexer 34 receives a data packet containing a parameter field in a header, and quantized data in a payload section of the packet. Demultiplexer 34 sends the minimum pixel value index and the predetermined range index to min-max-range decoder (MMRD) 38. Demultiplexer 34 sends the compresses first pixel value to first pixel decoder 37, which also receives the predetermined reconstructed range and minimum pixel values from MMRD 38. First pixel decoder 37 uses these three values to reconstruct the reference pixel and send it to predictor 24. Upon dequantization, demultiplexer 34 sends the quantized values to dequantizer mapper 36, which dequantizes the prediction error values and passed them to adder 39. Adder 39 adds the predicted value to the dequantized error value and passes the result to prediction error processor 35, which compares the result to the reconstructed maximum pixel block value. If the error value was biased before quantization, the result will be greater than the reconstructed maximum pixel value. If not, the result will be less than or equal to the reconstructed maximum pixel value. If prediction error processor 35 determines the error value was biased, the predetermined range value is subtracted from the result, thereby correcting for the bias introduced on the quantization side of the process. Pixel error processor 35 and first pixel processor 37 pass the reconstructed data including the reference pixel in proper order to an output network (e.g., a display processor, not shown).

The values available to dequantizer 26 are quantized and/or encoded values. The reconstructed quantized minimum pixel value must be less than or equal to the actual minimum pixel value, and the reconstructed quantized maximum pixel value and the reconstructed quantized range value must be greater than or equal to their actual values. MMRP 30 ensures these requirements are met, as previously discussed.

The following equations (5) to (12) illustrate that a biased error value will be greater than the reconstructed quantized maximum block pixel value, thereby allowing proper identification and correction of biased data during reconstruction. Equations (6) to (11) are given to help understand the derivation of equation (12). In the equations, $Q_{min}$ is the quantized minimum block pixel value, and $Q_{max}$ is the quantized maximum block pixel value. X is any pixel value from a given pixel block, and P is the predicted pixel value of X. E is the error value, or the actual difference between X and P; E may be a positive or negative number. Q(E) is the quantized value of E, and is the result of adding E and the quantization noise $N_q$; $N_q$ may be a positive or negative number. $X_r$ is the reconstructed pixel value of X, and $R_q$ is the best-fit predetermined range. Consider the following relationships.

$$Q_{max} = Q_{min} + R_q - 1 \quad (5)$$

$$E = X - P \quad (6)$$

$$Q(E) = E + N_q \quad (7)$$

$$Q_{min} <= X <= Q_{max} \quad (8)$$

For any positive value of E, the following relationships exist.

$$X_r = Q(E) + P = E + N_q + P = X - P + N_q + P \quad (9)$$

$$X_r = X + N_q \quad (10)$$

Equation (9) represents the values which decompressor 16 uses to reconstruct any pixel value.
Equation (10) simplifies equation (9) to values available to compressor 12. For any negative value of E, the following exists.

$$X_r = Q(E + R_q) + P = E + R_q + N_q + P = X - P + R_q + N_q + P \quad (11)$$

$$X_r = X + R_q + N_q \quad (12)$$

Equation (11) represents the values which decompressor 16 uses to reconstruct any pixel value. Equation (12) simplifies equation (11) to values available to compressor 12. To simplify the discussion, let $N_q$ equal zero in equation (12). Since X must be greater than or equal to $Q_{min}$ (equation (8)), and given the relationship of equation (5) which defines $Q_{max}$, adding the predetermined range to any pixel value results in a value greater than $Q_{max}$ by at least one.

The implementation of the present invention must consider the results of equation (10) and equation (12) if $N_q$ is not zero. If $N_q$ is positive, the result of equation (10) may be greater than $Q_{max}$, and prediction error processor 35 may falsely identify a biased prediction error. Likewise, if $N_q$ is negative, the result of equation (12) may be less than $Q_{max}$, and prediction error processor 35 may falsely identify an unbiased prediction error.

FIG. 5A illustrates how quantizer mapper 28 ensures its output will not be misinterpreted due to quantization noise. Quantizer 80 provides three output values for each pixel value quantized. The three values are the best reconstruction level for the decision point (I) of the quantization table, and the reconstruction level on either side of the proper level (I+1, I−1). When the first or last level in a quantization table is best, only the next greater or smaller quantization level is provided with the best level. Then combiner 84 calculates the reconstructed pixel value (equation (10) or equation (12)) for the best reconstruction value and compares the result to $Q_{max}$ by combiner 86. If the prediction error was biased (S2 is negative) and the result from combiner 86 is less than $Q_{max}$ (S1 is negative), it is possible that upon reconstruction prediction error processor 35 will incorrectly determine that the dequantized prediction error value was not biased. To prevent this problem, the codeword corresponding to the next larger reconstruction level for the prediction error is sent to multiplexer 32. If the prediction error was not biased (S2 is positive) and the result from combiner 86 is greater than $Q_{max}$ (S1 is positive), it is possible that upon reconstruction prediction error processor 35 will incorrectly determine that the dequantized prediction error value was biased. To prevent this problem, the codeword corresponding to the next smaller reconstruction level for the prediction error is sent to multiplexer 32. FIG. 5B depicts a truth table illustrating the outputs of quantizer 80 available as an output of quantization mapper 28, as selected by unit 82 in response to signals ±S1 and ±S2.

FIG. 6A aids in explaining why selecting the next larger or smaller reconstruction level corrects the problem which occurs when quantization noise causes the reconstructed level to give an erroneous result when determining if the quantized prediction error is biased. "I" refers to the index value of the tables. Any prediction error value less than or equal to decision point I but greater than decision point I−1 is quantized and then reconstructed to value R. As can be seen from the three and four bit quantization tables in FIGS. 6B and 6C respectively, prediction error values input to the table and within any decision point I may be both greater than, equal to, or less than the prediction error reconstruction level value R. For example, in FIG. 6C, index level 7 accepts input values from 36 to 28 inclusive as defined by decision point value 36 for level 7 and decision point value 27 of level 6. Any input value within this range will be dequantized to the reconstruction level value of 32. If the input value is 34, then the quantization error is −2; if the input value is 32, then the quantization error is 0; and if the input value is 29, then the quantization error is 3. As stated earlier, these errors are defined as quantization noise. A negative quantization noise value corresponds to −E in FIG. 6A. A positive quantization noise value corresponds to +E in FIG. 6A. If the prediction error reconstruction level is not equal to the actual prediction error, the difference is the quantization noise which will be positive or negative. If quantizer mapper 28 determines that upon reconstruction quantization noise will cause an incorrect analysis of whether the prediction error is biased, choosing the level on the other side of the polarity of the quantization noise corrects the problem. Continuing with the above example, if reconstruction level value 32 causes −E=−2 and may cause incorrect analysis, the I+1 reconstruction level value is select which has quantization noise value equal to ++E which ensures bias is correctly recognized and processed. Since it is the quantization noise which may cause the analysis of bias correction to be incorrect, choosing a value of quantization noise with an opposite sign will not influence the relationship between $Q_{max}$ and the reconstructed pixel value.

Because the absolute value of Nq is generally not large, quantizer 80 will normally choose the best quantization level. When quantizer 80 chooses the next larger or smaller level, the choice will induce added error into the reconstructed pixel. However, the error is minimized by selecting the closest level which will correct the problem in a table with resolution which is much better than known DPCM quantization tables. Generally, this correction does not cause noticeable degradation in the quality of the displayed picture.

Quantization resolution is often increased by more than the factor of two which occurs from biasing negative prediction errors. The selection of a predetermined range also leads to increased quantization resolution. For example, if for a given pixel block the selected predetermined range is 16, then a four bit, sixteen level table (not shown) will exactly quantize the prediction error values. For 8 bit pixel values the resolution increases by a factor of 16 from a quantization table accepting input values for the range of 256 to a quantization table accepting input values for the range of 16 (256/16). By requiring only positive values in the quantization/dequantization table for the same positive range value, the resolution increases by another factor of 2 to a total factor of 32. This process may be used to calculate the increase in resolution for quantization/dequantization table derived from any of the predetermined range values.

Figure 7:
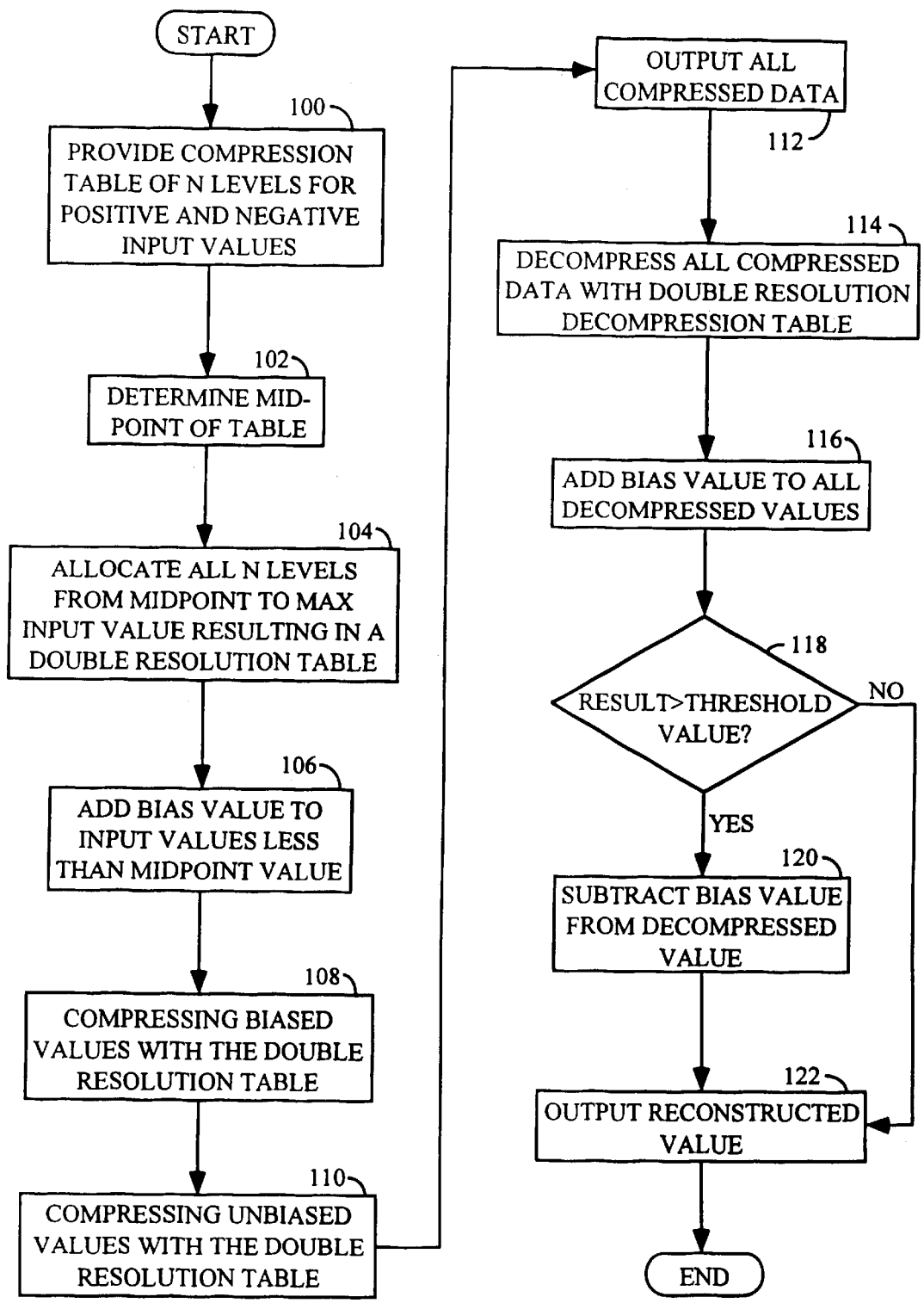
FIG. 7 is a flow chart of the design of a quantization/dequantization table and of processing data using the table according to the present invention.

FIG. 7 is a flow chart illustrating the design of a quantization table and of processing data with the quantization table according to the principles of the present invention. In step 100, a known quantization table of N levels is designed which will accept both positive and negative input values. For this example, the input values are DPCM prediction error values, and the positive and negative input values are therefore symmetrical about zero. In step 102, the midpoint of the table, zero in this case, is determined. All N levels are assigned from the midpoint to the maximum prediction error value in step 104. The resulting quantization table has double the resolution of the beginning table. The resolution of each quantization level may be adjusted according to the statistical occurrence of the input values.

In step 106, input values less than the midpoint value are added to a bias value. For DPCM prediction error values the bias value may be the range of an associated data block. In steps 108 and 110 the biased and unbiased input values are compressed with the high resolution quantization table. Step 112 outputs all compressed data as it is quantized. Step 114 decompressed the compressed data with the high resolution table producing decompressed output values. Step 116 adds the bias value to all decompressed output values. Step 118 compares the result for each output value to a threshold value. This value may be the maximum input data value for the associated data block. If the result is greater than the threshold value then the decompressed output value includes bias, and the bias value is subtracted in step 120, and the reconstructed value is output to an output network in step 122. If in step 118 the result is not greater than the threshold value, the decompressed output value does not include bias, and the result is the reconstructed value which is output to an output network in step 122.

Referring back to FIG. 1, memory 14 stores the quantized pixel block and the parameter field until they are no longer needed for pixel reconstruction and display. During the time the data reside in memory 14, they may be accessed and decoded by a subsequent display processor via decompressor 16 under the control of a microprocessor using a common data bus. Compressor 12 and decompressor 16 reside in a common integrated circuit and exhibit similar design and construction to simplify the integrated circuit. Memory 14 advantageously resides outside the integrated circuit, thereby allowing the size of memory 14 to be selected as needed to accommodate the signal processing requirements of a particular system. This results in manufacturing cost savings, e.g., in the case of a reduced cost consumer television receiver using a reduced resolution display requiring less frame memory for the MPEG decoder. Also, saved storage area is typically usable by other system components which increases overall system capability.

Figure 8:
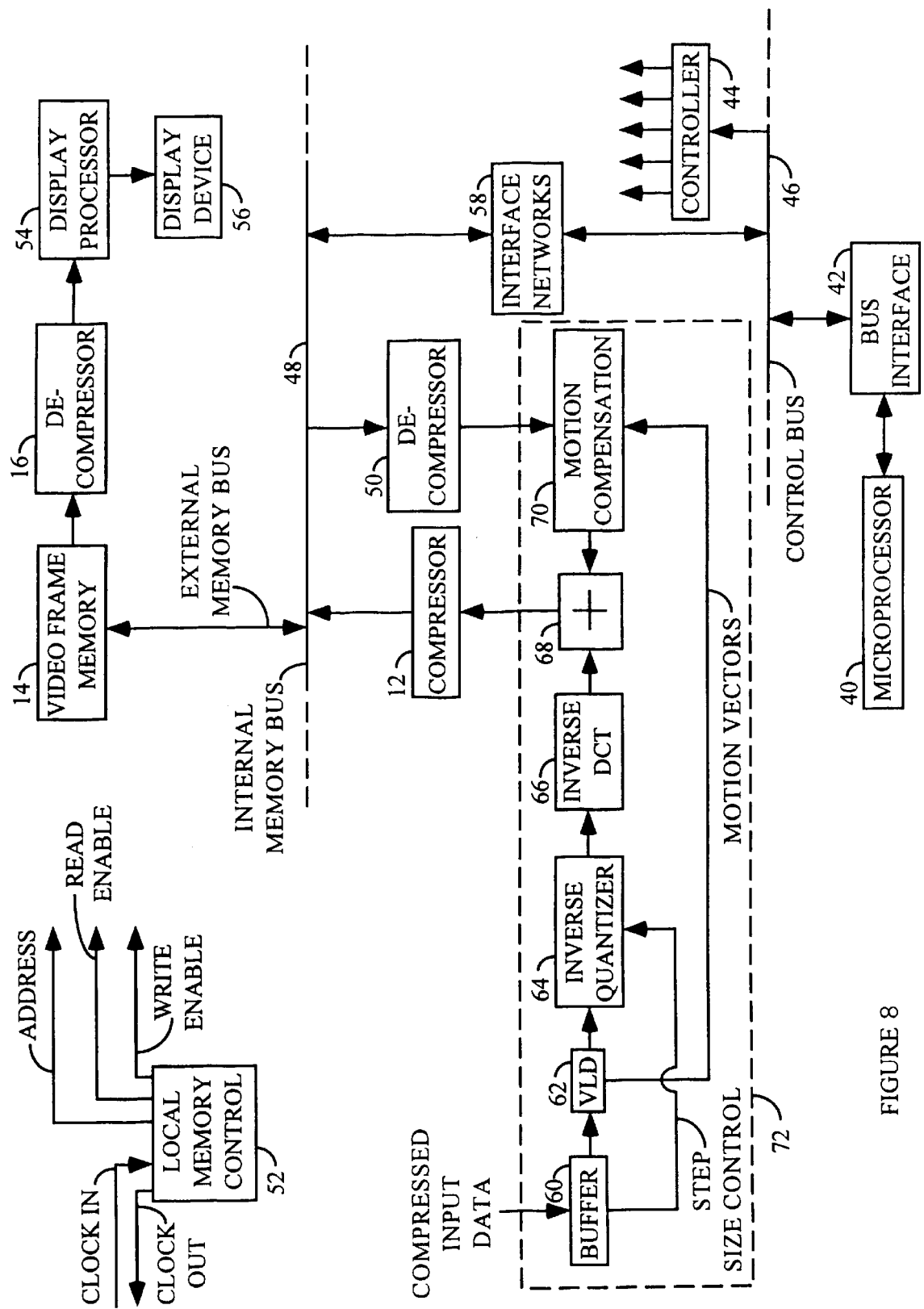
FIG. 8 is a block diagram of an MPEG compatible television system employing the present invention.

FIG. 8 exemplifies portions of a practical digital signal processing system in a television receiver, including apparatus according to the present invention as discussed previously. The digital television receiver system of FIG. 8 is simplified so as not to burden the drawing with excessive detail. For example, not shown are FIFO input and output buffers associated with various elements, read/write controls, clock generator networks, and control signals for interfacing to external memories which can be of the extended data out type (EDO), synchronous type (SDRAM), rambus DRAM (RDRAM), or any other type RAM.

Common elements in FIG. 1 and FIG. 8 have the same identifier. Elements in signal processor 72, except for unit 70, correspond to elements found in the STi 3500A MPEG-2/CCIR 600 Video Decoder integrated circuit commercially available from SGS-Thomson Microelectronics.

Briefly, the system of FIG. 8 includes microprocessor 40, bus interface unit 42 and controller 44 coupled to an internal control bus 46. In this example, microprocessor 40 is located external to the integrated circuit containing MPEG decoder 72. A 192 bit wide internal memory bus 48 is a conduit for data to and from compressor 12, similar decompressors 16 and 50, and external frame memory 14. Units 12, 16 and 50 receive compression and decompression factor control signals from microprocessor 40 via controller 44, along with enable control signals. Also included is a local memory control unit 52 which receives Request inputs and provides Acknowledge outputs as well as memory Address outputs, Read Enable and Write Enable outputs. Memory control unit 52 generates real time address and control signals for controlling memory 14. Memory control unit 52 also provides output clock signals Clock Out in response to input clock signals Clock In from a local clock generator (not shown). Microprocessor 40 partitions memory 14 into bit buffers, video frame storage sections and frame storage buffers for MPEG decoding, and display processing and on-screen display maps.

Display processor 54 includes horizontal and vertical resampling filters as needed to convert a decompressed image format to a predetermined common format for display by an image reproducing display device 56. For example, the system may receive and decode image sequences corresponding to formats such as 525 line interlaced, 1125 line interlaced or 720 line progressive scan. A television receiver will likely use a common display format for all receiver formats.

External interface networks 58 convey control and configuration information between the MPEG decoder and external microprocessor 40 in addition to input compressed video data for processing by the MPEG decoder. The MPEG decoder system resembles a coprocessor-processor for microprocessor 40. For example, microprocessor 40 issues a decode command to the MPEG decoder for each frame to be decoded. The decoder locates the associated header information, which microprocessor 40 then reads. With this information microprocessor 40 issues data for configuring the decoder, e.g. with respect to frame type, quantization matrices, etc., after which the decoder issues appropriate decode commands. Technical specification materials for the SGS-Thomson STi 3500A integrated circuit device noted above provide additional information concerning such manner of MPEG decoder operation.

Microprocessor 40 conveys mode control data, programmed by the receiver manufacturer, to memory controller 52 for controlling the operation of multiplexer 32 (FIG. 2) and demultiplexer 36 (FIG. 5), and for establishing the compression/decompression factors for units 12, 16, and 50 as required. The disclosed system can be used with all Profiles and all Levels of the MPEG specification in the context of various digital data processing schemes, such as may be associated with terrestrial broadcast, cable and satellite transmission systems, for example.

FIG. 8 also depicts a portion of a digital video signal processor 72 such as may be found in a television receiver for processing an input high definition video signal. Signal processor 72 may be included in an integrated circuit which includes provisions for receiving and processing standard definition video signals via an analog channel (not shown). Signal processor 72 includes a conventional MPEG decoder constituted by blocks 60, 62, 64, 66, 68, and 70, including frame memory 14. For example, Ang et al. "Video Compression Makes Big Gains," IEEE Spectrum, October 1991, describes the operation of an MPEG encoder and decoder.

Signal processor 72 receives a controlled data stream of MPEG coded data from a preceding input processor (not shown), e.g., a transport decoder which separates data packets after input signal demodulation. In this example, the received input data stream represents high definition image material (1920×1088 pixels) as specified in the Grand Alliance specification for the United States high definition terrestrial television broadcast system. The input data stream is in the form of a layered data stream representing a sequence of images which have been compressed using the MPEG compression standard. Periodically, these images are compressed and coded as intraframe and interframe information. The intraframe information comprises I-frame anchor frames. Generally, the interframe information comprises predictive motion coded residual information representing the image difference between adjacent picture frames. The interframe motion coding involves generating motion vectors representing the offset between a current block being processed and a block in a prior reconstructed image. The motion vector which represents the best match between the current and prior blocks is coded and transmitted. Also, the difference (residual) between each motion compensated 8×8 block and the prior reconstructed block is discrete cosine transformed (DCT), quantized and variable length coded (VLC) before being transmitted. Various publications, including Ang, et al. above, describe motion compensated coding processes in greater detail.

Buffer 60 accepts the input compressed pixel data blocks before being variable length decoded by variable length decoder (VLD) 62. Buffer 60 exhibits a storage capacity of 1.75 Mbits in the case of a main level, main profile MPEG data stream. Inverse quantizer 64 and inverse discrete cosine transformer (IDCT) 66 decompress decoded compressed data from VLD 62. Output data from IDCT 66 is coupled to one input of adder 68.

A signal from buffer 60 controls the quantization step size of inverse quantizer 64 to assure smooth data flow. VLD 62 provides decoded motion vectors to motion compensation unit 70 as will be discussed. VLD 62 also produces an inter/intra frame mode select control signal as known (not shown for simplification). The operation performed by units 62, 64, and 66 are inverse corresponding operations of an encoder located at a transmitter.

By summing the residual image data from unit 66 with predicted image data provided from the output of unit 70, adder 68 provides a reconstructed pixel based on the contents of video frame memory 14. When signal processor 72 has processed an entire frame of pixel blocks, frame memory 14 stores the resulting reconstructed image. In the interframe mode, motion vectors obtained from VLD 62 provide the location of the predicted blocks from unit 70.

The image reconstruction process involving adder 68, memory 14 and motion compensation unit 70 advantageously exhibits significantly reduced memory requirements due to the use of block compressor 12 prior to data storage in frame memory 14. The size of frame memory 14 may be reduced by up to fifty percent (50%), for example, when a 50% compression factor is used. Unit 50 performs the inverse function of unit 12, and is similar to decompressor 16 described above. Decompressor 50 reconstructs the image block so motion compensator 70 may function as described above. Compressor 12 and decompressors 16 and 50 are constructed in accordance with the principles of the present invention. FIGS. 1, 2, 4 and 5A illustrate details within units 12, 16 and 50.

The following is claimed:

1. In a video processing system, a method for quantizing pixel block data having values of positive and negative polarity about an intermediate point within an encompassing range of pixel block limit values, comprising the following steps:
   (a) identifying pixel values of positive polarity with respect to said intermediate point;
   (b) identifying pixel values of negative polarity with respect to said intermediate point;
   (c) assigning a common set of quantization level codes to both said identified positive and negative polarity pixel values wherein an individual pixel value is assigned a quantization level code based on absolute value of said individual pixel, to provide quantized data; and
   (d) adding a bias value to negative polarity pixel values to produce biased input values of positive polarity with respect to said intermediate point; and
   (e) outputting said compressed biased and unbiased data to an output network.

2. The method of claim 1, comprising the following further steps in providing decoded data:
   adding a predicted pixel value to quantized data values to produce test values;
   comparing each of said test values to a threshold value;
   identifying said test values which are greater than said threshold value as biased data values; and
   subtracting said predicted pixel value from identified biased data values to obtain decoded data.

3. The method of claim 2, wherein:
   said threshold value is the maximum pixel block value.

4. The method of claim 1, wherein said step of assigning a common set of quantization level codes includes the step of
   assigning a neighbouring quantization level code of a quantization level code to replace said quantization level code if a summation of a quantized value with a predicted value exceeds said range of pixel block limit values.

5. In a digital signal processing system for processing image representative compressed pixel data, a method comprising the steps of:

(a) decoding said compressed pixel data to produce a quantization value representative of a pixel error value in a pixel block;

(b) determining a predicted value of said pixel error value from previously decoded neighboring pixel values in said pixel block;

(c) determining a pre-quantization polarity of said pixel error value based on a summation of said quantization value with said predicted value; and (d) decoding said quantization value using said determined polarity.

6. The Method of claim 5, wherein said pre-quantization polarity is determined by comparing said summation with a predetermined maximum pixel block limit value.

7. In a digital signal processing system for processing image representative pixel data, apparatus comprising:

a first processor for processing said image representative pixel data to produce DPCM prediction error values;

a second processor for adding a bias value to negative prediction error values to produce positive re-biased prediction error values; and a quantizer for quantizing said positive re-biased prediction error values and unbiased prediction error values to produce quantized data by assigning a common set of quantization level codes to both said positive re-biased prediction error values and said unbiased prediction error values.

8. A system according to claim 7, further comprising:

a dequantizer for dequantizing said quantized values to reconstruct said positive biased prediction error values and said unbiased prediction error values;

a third processor for identifying said positive biased prediction error values and subtracting said bias value from said positive biased prediction error values to produce said negative prediction error values; and a fourth processor for processing said positive and negative prediction error values to produce reconstructed image representative pixel data.

9. The method of claim 5, wherein in decoding said quantization value, a predicted pixel value is added to a quantized pixel error value.

10. The method of claim 5, wherein said pixel error value represents one of, (a) a luminance difference between a predicted pixel value and a current pixel value, and (b) a chrominance difference between a predicted pixel value and a current pixel value.

11. The method of claim 5, including the step of subtracting a bias value from said summation if said pre-quantization polarity is determined to be negative.

12. The method of claim 5, wherein said step of decoding said quantization value includes the step of, producing a predicted pixel value, and adding an error quantization value representing a difference between a predicted pixel value and a nonpredicted pixel value.

13. The method of claim 5, wherein said pixel error value has one of, (a) a positive Polarity value and (b) a negative polarity value, about an intermediate point within an encompassing range of pixel block limit values.

\* \* \* \* \*

UNITED STATES PATENT AND TRADEMARK OFFICE
CERTIFICATE OF CORRECTION

PATENT NO.        : 6,621,934 B1
APPLICATION NO. : 08/910709
DATED             : September 16, 2003
INVENTOR(S)      : Yu et al.

Page 1 of 1

It is certified that error appears in the above-identified patent and that said Letters Patent is hereby corrected as shown below:

On the title page "Under (56) references." add the following
--4,255,763 A   03/1981 Maxemchuk, et al.    382/338
 4,716, 453 A   12/1987 Pawelski             348/396
 5,432,870 A    07/1995  Schwartz            382/232
 2,905,756  A    09/1956  Graham              348/411.--.

Signed and Sealed this

Twenty-fifth Day of September, 2007

JON W. DUDAS
*Director of the United States Patent and Trademark Office*